(12) United States Patent
Yamazaki

(10) Patent No.: US 11,327,853 B2
(45) Date of Patent: May 10, 2022

(54) MULTICORE SYSTEM FOR DETERMINING PROCESSOR STATE ABNORMALITY BASED ON A COMPARISON WITH A SEPARATE CHECKER PROCESSOR

(71) Applicant: SANKEN ELECTRIC CO., LTD., Niiza (JP)

(72) Inventor: Takanaga Yamazaki, Niiza (JP)

(73) Assignee: SANKEN ELECTRIC, LTD., Niiza (JP)

( * ) Notice: Subject to any disclaimer, the term of this patent is extended or adjusted under 35 U.S.C. 154(b) by 0 days.

(21) Appl. No.: 17/141,293

(22) Filed: Jan. 5, 2021

(65) Prior Publication Data

US 2021/0124635 A1 Apr. 29, 2021

Related U.S. Application Data

(63) Continuation of application No. PCT/JP2018/026921, filed on Jul. 18, 2018.

(51) Int. Cl.
*G06F 11/16* (2006.01)

(52) U.S. Cl.
CPC ............... *G06F 11/1641* (2013.01)

(58) Field of Classification Search
CPC ............ G06F 11/0724; G06F 11/1629; G06F 11/1641
USPC .................................................. 714/10, 11
See application file for complete search history.

(56) References Cited

U.S. PATENT DOCUMENTS

| | | | |
|---|---|---|---|
| 5,892,897 A * | 4/1999 | Carlson | G06F 11/3648 714/37 |
| 7,085,959 B2 * | 8/2006 | Safford | G06F 11/1641 714/11 |
| 7,747,932 B2 * | 6/2010 | Racunas | G06F 11/165 714/799 |
| 8,171,328 B2 | 5/2012 | Mukherjee et al. | |
| 8,806,269 B2 * | 8/2014 | Krishnamurthy | G06F 11/187 714/11 |
| 2019/0155680 A1 * | 5/2019 | Yamate | G06F 11/3055 |

FOREIGN PATENT DOCUMENTS

| | | |
|---|---|---|
| JP | 2005-129053 A | 5/2005 |
| JP | 2011-145900 A | 7/2011 |
| JP | 2012-514257 A | 6/2012 |
| JP | 2016-35626 A | 3/2016 |

OTHER PUBLICATIONS

International Search Report of PCT/JP2018/026921 dated Jul. 18, 2018.

* cited by examiner

*Primary Examiner* — Joseph R Kudirka
(74) *Attorney, Agent, or Firm* — Metrolek IP Law Group, PLLC

(57) ABSTRACT

A multicore system according to one or more embodiments is disclosed, which may include processors that execute processing different from each other, a selector that selects one of the processors, a checker processor, a comparator that compares an external state of the processor selected by the selector with an external state of the checker processor, or compares an internal state of the processor selected by the selector with an internal state of the checker processor, and a controller that determines that the selected processor or the checker processor is abnormal in response to the external states or the internal states not matching each other based on comparison results obtained by the comparator.

10 Claims, 8 Drawing Sheets

MULTICORE SYSTEM FOR DETERMINING PROCESSOR STATE ABNORMALITY BASED ON A COMPARISON WITH A SEPARATE CHECKER PROCESSOR

CROSS REFERENCE TO RELATED APPLICATIONS

This application is a continuation application of International Application No. PCT/JP2018/026921, filed on Jul. 18, 2018, the entire contents of which are incorporated herein by reference.

BACKGROUND

The disclosure relates to a multicore system of functional safety-compliant self-check type.

In general, a CPU core of dual core lockstep type is adopted as a CPU core of a microcomputer for vehicle installation that requires to have high reliability. FIG. 8 is a circuit configuration diagram of a conventional dual core lockstep. The dual core lockstep is provided with a main core 30 that executes practical processing and a checker core 40 for checking.

A delay circuit 31 and a delay circuit 32 delay an address bus, a command bus, and a write data bus of the main core 30 for three cycles, for example, and a comparator 34 and a comparator 35 compare the address bus, the command bus, and the write data bus from the delay circuits 31 and 32 with an address bus, a command bus, and a write data bus of the checker core 40 for checking. Then, when the comparison results do not match each other, it is determined to be abnormal.

Japanese Patent Application Publication No. 2005-129053 discloses multicore microprocessing as a method of checking multiple CPUs in operation. In this method, a checking target core is selected by the round robin method, contexts in the checking target core are moved to another CPU, and then the checking target core is checked by a self-check method by a dedicated self-diagnosis program.

However, in a case of a microcomputer that includes multiple DSPs (dedicated cores) therein in addition to the main core 30 illustrated in FIG. 8, if the dual core lockstep is adopted to each one of the dedicated cores to check the dedicated cores in operation, the amount of the hardware is increased. Additionally, the power consumption is also increased.

In Japanese Patent Application Publication No. 2005-129053, it is required to separate the checking target core from the practical operation. This prevents the core from operating continuously.

SUMMARY

A multicore system according to one or more embodiments is disclosed, which may include processors that execute processing different from each other, a selector that selects one of the processors, a checker processor, a comparator that compares an external state of the processor selected by the selector with an external state of the checker processor, or compares an internal state of the processor selected by the selector with an internal state of the checker processor, and a controller that determines that the selected processor or the checker processor is abnormal in response to the external states or the internal states not matching each other based on comparison results obtained by the comparator.

DETAILED DESCRIPTION

Hereinafter, a multicore system according to one or more examples is described with reference to the drawings.

Example 1

Figure 1:
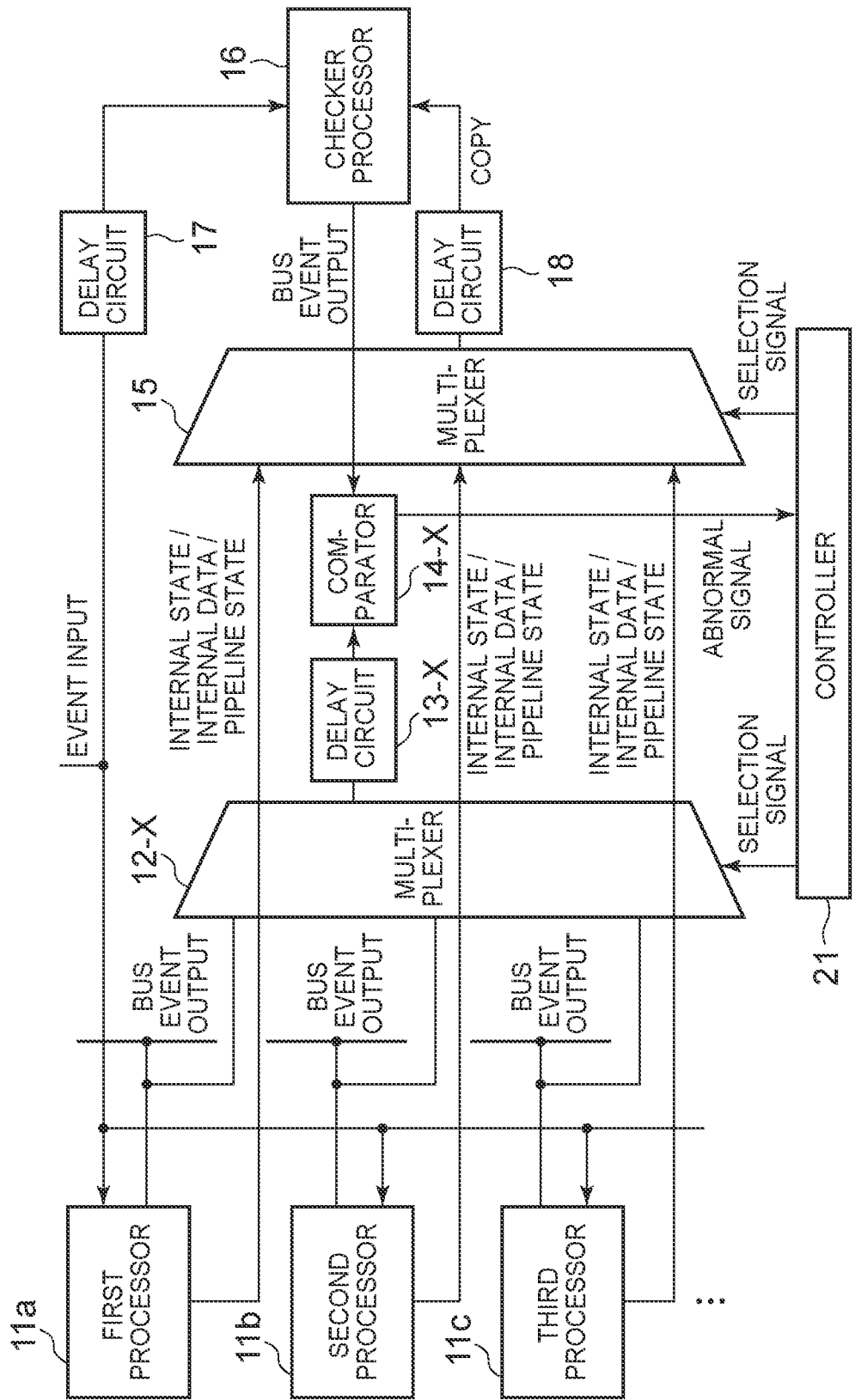
FIG. 1 is a circuit configuration diagram illustrating a multicore system, such as in an example 1.
Figure 2:
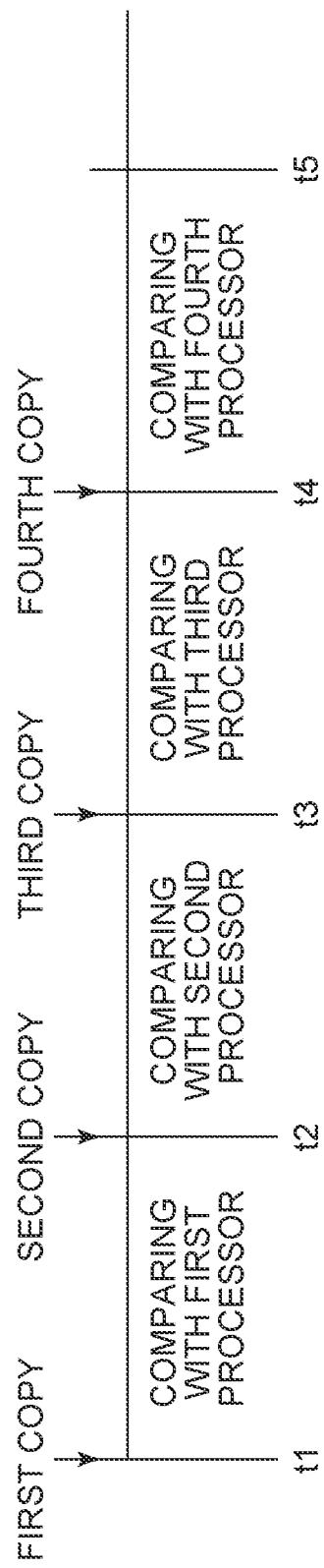
FIG. 2 is a diagram illustrating a timing chart of processing of comparing processors and a checker processor by the round robin method of a multicore system shown, such as in the example 1.

FIG. 1 is a simplified overall circuit configuration diagram of a multicore system of functional safety-compliant self-check type in an example 1. The multicore system of functional safety-compliant self-check type in the example 1 illustrated in FIG. 1 is provided with a first processor 11a, a second processor 11b, a third processor 11c, a multiplexer 12-X (X indicates 1, 2, 3, or 4. Descriptions thereof are omitted hereinafter), a delay circuit 13-X, a comparator 14-X, a multiplexer 15, a checker processor 16, a delay circuit 17, a delay circuit 18, and a controller 21.

FIG. 1 illustrates only the three processors; however, the multiple processors may include n processors (n≥4) in some cases. In contrast, the number of the checker processor is only one.

The processors, which are the first processor 11a, the second processor 11b, and the third processor 11c, are formed of CPU cores and execute processing different from each other.

The multiplexer 12-X may correspond to a selector in the specification, and the multiplexer 12-X selects processors from the multiple processors by round robin or by time sharing based on a selection signal from the controller 21. The multiplexer 12-X may select either one of the multiple processors 11a to 11c based on the selection signal from a controller 21. Instead of selecting the multiple processors by the round robin method, it is possible to arbitrarily select the processors like the processor 11a, the processor 11c, the processor 11a, and then the processor 11b, for example.

The delay circuit 13-X may correspond to a first delay circuit in the specification, and the delay circuit 13-X delays contents from the processor selected by the multiplexer 12-X for a predetermined delay time and outputs the contents to the comparator 14-X.

Figure 3:
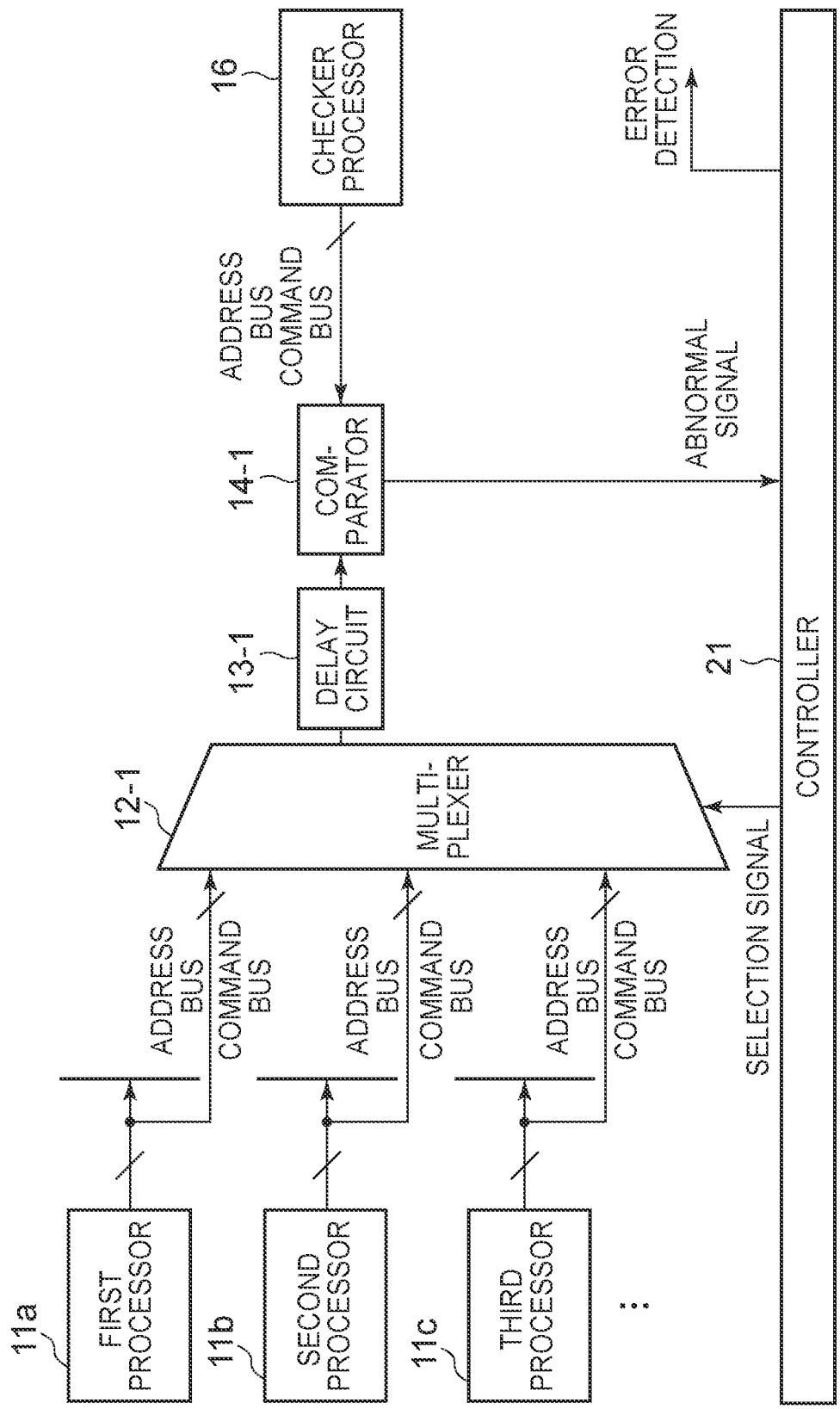
FIG. 3 is a diagram illustrating a controller that determines whether it is abnormal by comparing address buses and comparing command buses between processors and checker processor of a multicore system shown, such as in the example 1.
Figure 4:
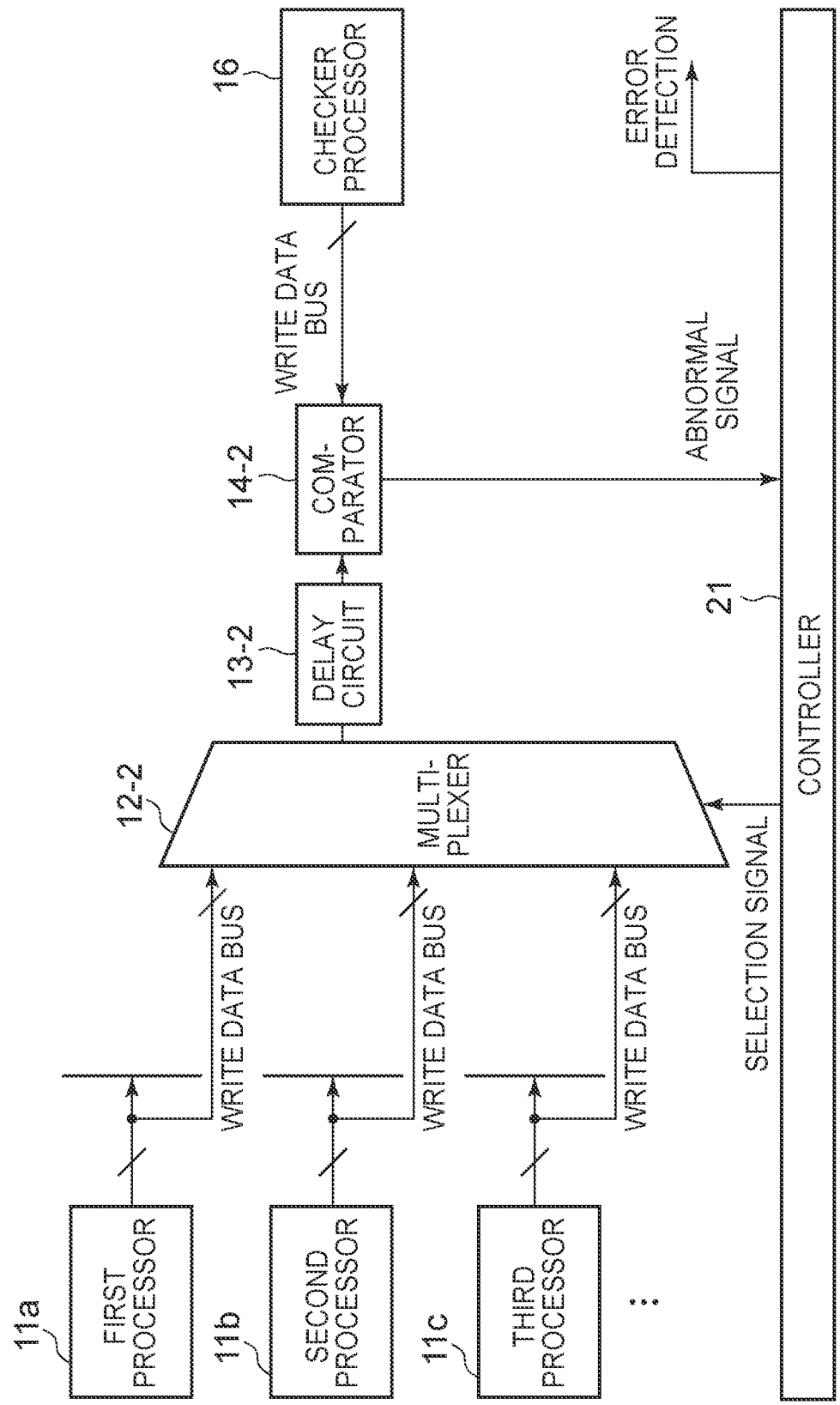
FIG. 4 is a diagram illustrating a controller that determines whether it is abnormal by comparing write data buses between processors and checker processor of a multicore system, such as in the example 1.
Figure 6:
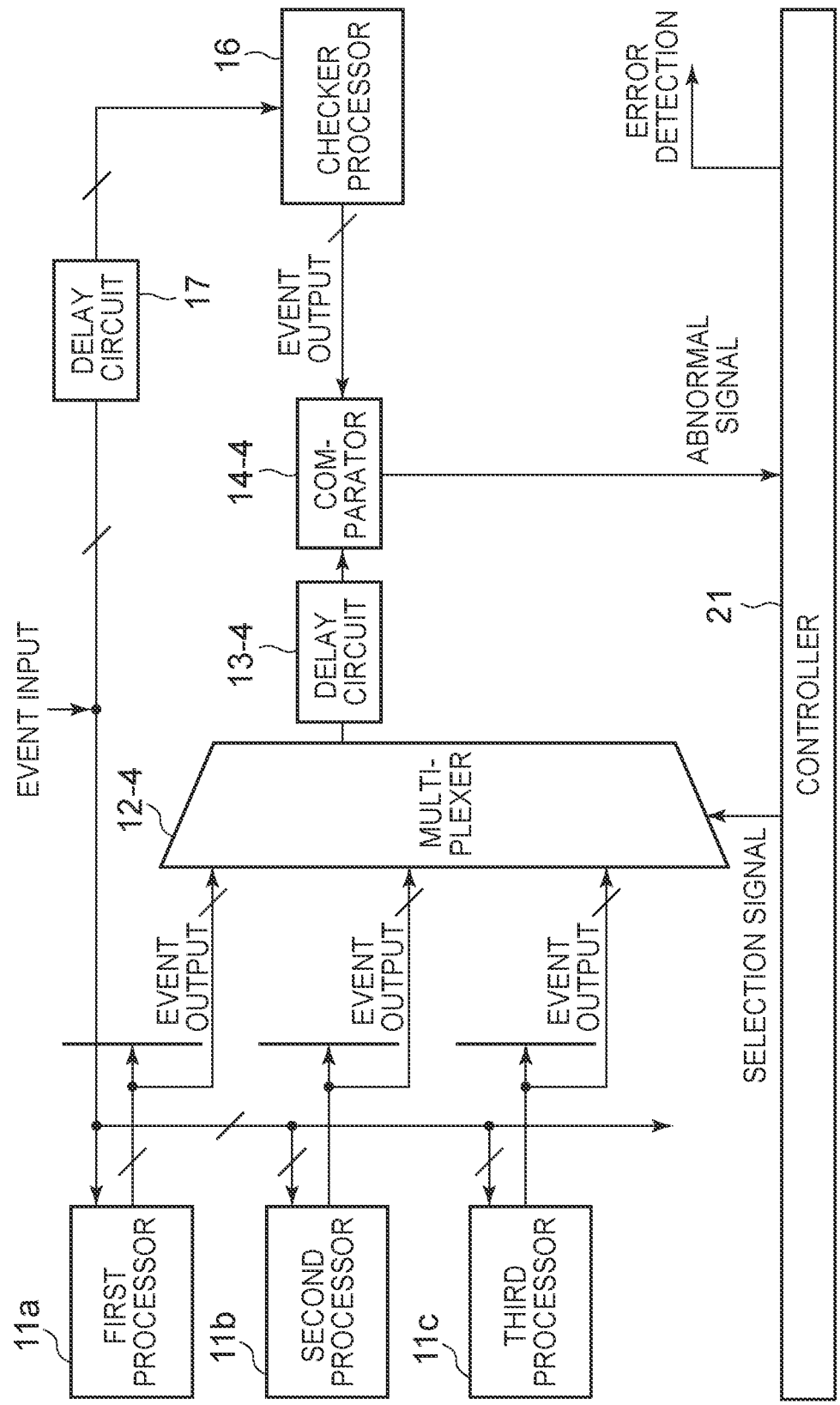
FIG. 6 is a diagram illustrating a wire connection of an event input between processors and checker processor and controller that determines whether it is abnormal by comparing event outputs between processors and checker processor of a multicore system shown, such as in the example 1.

The comparator 14-X may correspond to a comparator in the specification, and the comparator 14-X compares an external state (for example, although it is not limited, signal values on an address bus and a command bus illustrated in FIG. 3, a signal value on a write data bus illustrated in FIG. 4, an event output signal value illustrated in FIG. 6, and the like) of the processor that is delayed by the delay circuit 13-X and is selected by the multiplexer 12-X with an external state of the checker processor 16, or the comparator 14-X compares an internal state of the selected processor with an internal state of the checker processor 16.

The controller 21 may correspond to a controller in the specification, and the controller 21 determines that the selected processor or the checker processor 16 is abnormal when the external states or the internal states do not match each other based on the comparison results obtained by the comparator 14-X, and the controller 21 determines that the selected processor and the checker processor 16 are normal when only the external states match each other, when only the internal states match each other, or when both the external states and the internal states match each other.

The controller 21 outputs the selection signal to the multiplexer 12-X for selecting a processor and also outputs a control signal to the multiplexer 15 for copying an internal state, internal data, and a pipeline state of a processor to be self-checked.

When starting the comparing of the processor selected by the multiplexer 12-X with the checker processor 16, the multiplexer 15 selects the processor that is selected by the multiplexer 12-X.

The controller 21 may correspond to a copy controller in the specification, and when starting the comparing of the processor selected by the multiplexer 12-X with the checker processor 16, the controller 21 copies an internal state (for example, a state of a state machine, an internal register value, and a pipeline state) of the processor selected by the multiplexer 12-X to the checker processor 16 through the multiplexer 15.

The delay circuit 18 may correspond to a second delay circuit in the specification, and the delay circuit 18 delays an internal state, internal data, and a pipeline state of the processor selected by the multiplexer 15 for a predetermined delay time and outputs the internal state, the internal data, and the pipeline state to the checker processor 16.

Next, operations of the multicore system in the example 1 are described in detail with reference to a timing chart illustrated in FIG. 2 and FIGS. 3 to 8.

First, the processors 11a to 11c are independently executing different kinds of processing. At clock time t1, the multiplexer 12-X selects the first processor 11a based on the selection signal from the controller 21. An external state or an internal state of the first processor 11a is transmitted to the comparator 14-X through the multiplexer 12-X and through the delay circuit 13-X.

Figure 7:
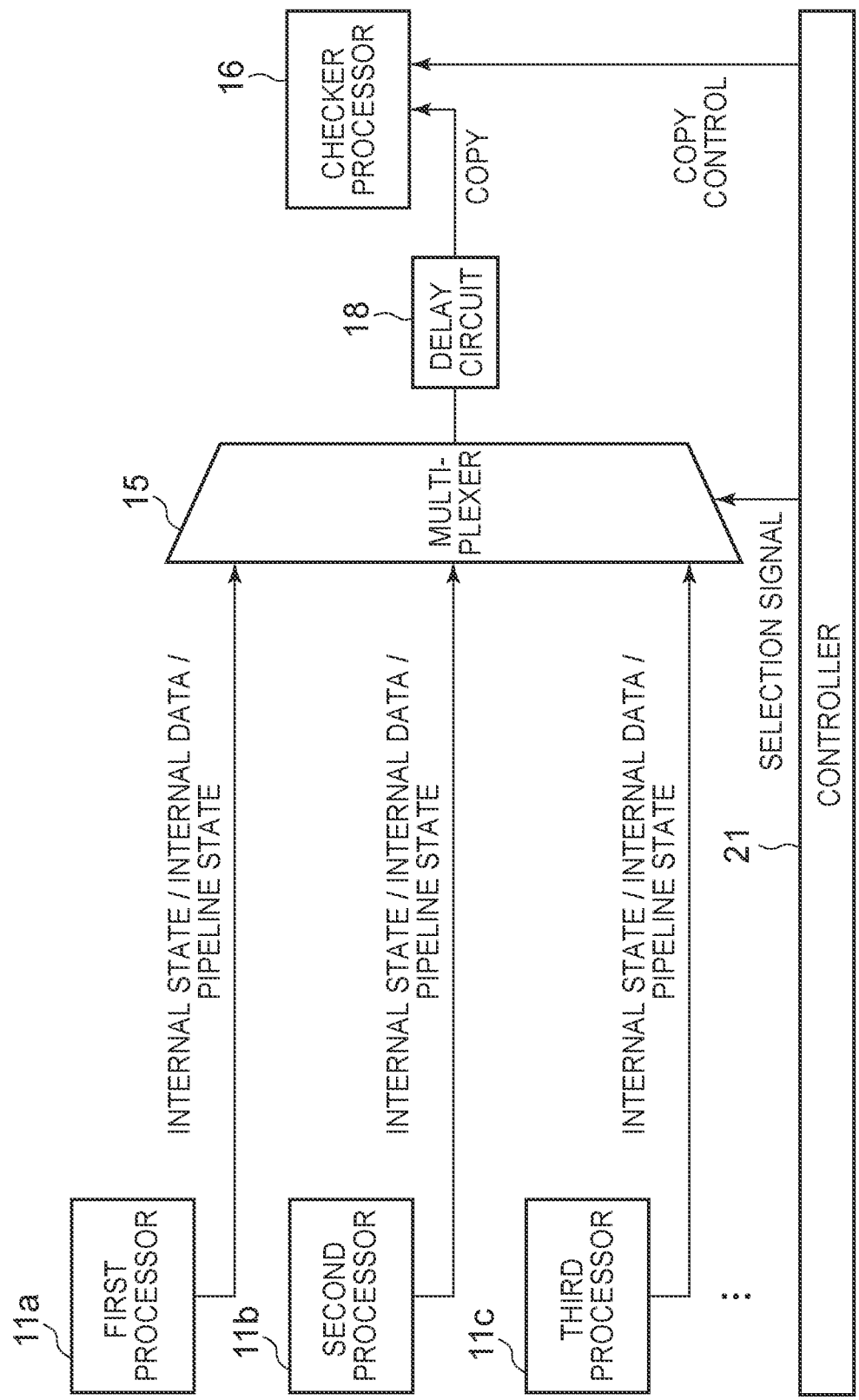
FIG. 7 is a diagram illustrating routes for copying internal states, internal data, and pipeline states of processors of a multicore system, such as in the example 1.
Figure 8:
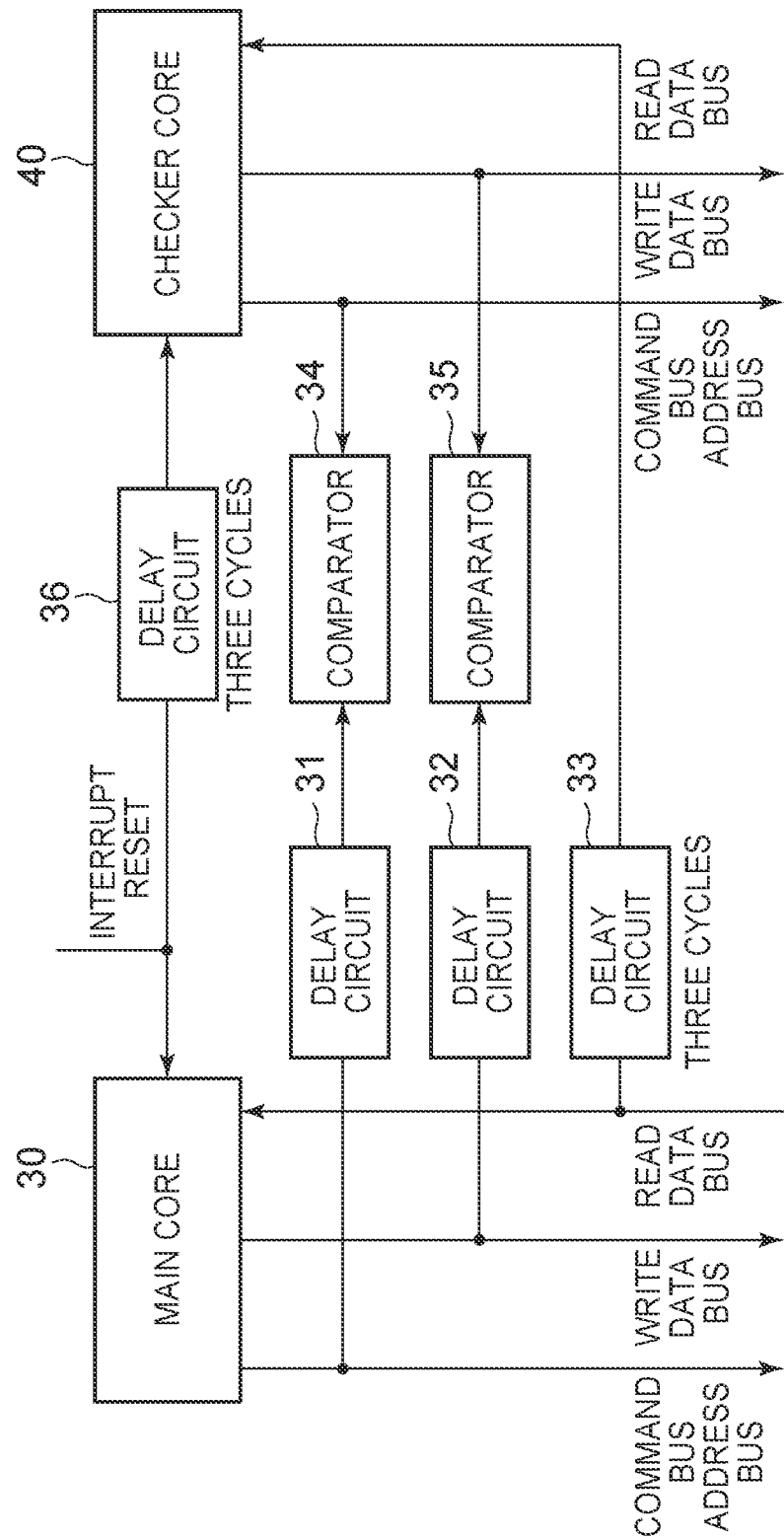
FIG. 8 is a circuit configuration diagram illustrating a dual core lockstep type of a related art.

Additionally, as illustrated in FIG. 7, the multiplexer 15 selects the first processor 11a, and the internal state, internal data, and a pipeline state of the first processor 11a are delayed by the delay circuit 18 through the multiplexer 15 and are copied to the checker processor 16.

The comparator 14-X compares the external state of the first processor 11a from the delay circuit 13-X with the external state from the checker processor 16, or the comparator 14-X compares the internal state of the first processor 11a with the internal state from the checker processor 16.

The controller 21 determines that the selected processor or the checker processor 16 is abnormal when the external states or the internal states do not match each other based on the comparison results obtained by the comparator 14-X, and the controller 21 determines that the selected processor and the checker processor 16 are normal when only the external states match each other, when only the internal states match each other, or when both the external states and the internal states match each other.

Next, at clock time t2, the multiplexer 12-X selects the second processor 11b based on the selection signal from the controller 21. An external state or an internal state of the second processor 11b is transmitted to the comparator 14-X through the multiplexer 12-X and through the delay circuit 13-X.

Additionally, as illustrated in FIG. 7, the multiplexer 15 selects the second processor 11b, and the internal state, internal data, and a pipeline state of the second processor 11b are delayed by the delay circuit 18 through the multiplexer 15 and are copied to the checker processor 16.

The comparator 14-X compares the external state of the second processor 11b from the delay circuit 13-X with the external state from the checker processor 16, or the comparator 14-X compares the internal state of the second processor 11b with the internal state from the checker processor 16.

The controller 21 determines that the selected processor or the checker processor 16 is abnormal when the external states or the internal states do not match each other based on the comparison results obtained by the comparator 14-X, and the controller 21 determines that the selected processor and the checker processor 16 are normal when only the external states match each other, when only the internal states match each other, or when both the external states and the internal states match each other.

Similarly, at clock time t3, the multiplexer 12-X selects the third processor 11c based on the selection signal from the controller 21, and comparing and determining processing that is similar to the comparing and determining processing between the first processor 11a and the checker processor 16 and the comparing and determining processing between the second processor 11b and the checker processor 16 is executed. Once the comparing and determining processing of all the processors is terminated, the process returns to the comparing and determining processing between the first processor 11a and the checker processor 16, and the comparing and determining processing is executed repeatedly.

Next, a specific target of the comparing and determining (the external state or the internal state) between the multiple processors 11a to 11c and the checker processor 16 is described. By way of example, the comparing between address buses, command buses, write data buses, and event outputs is described in detail with reference to FIGS. 3 to 6.

Only a case where the first processor 11a is selected by the multiplexer 12-X in response to the signal from the controller 21 is described. Even in a case where another processor is selected, processing similar to that of the case where the first processor 11a is selected is executed.

First, as illustrated in FIG. 3, an address bus and a command bus of the first processor 11a are transmitted to the comparator 14-1 through the multiplexer 12-1 and through the delay circuit 13-1.

On the other hand, the checker processor 16 outputs an address bus and a command bus to the comparator 14-1. The comparator 14-1 compares the output of the address bus and the command bus of the first processor 11*a* with the outputs of the address bus and the command bus of the checker processor 16, and when the address buses and the command buses do not match each other, the comparator 14-1 outputs an abnormal signal to the controller 21. Based on the abnormal signal from the comparator 14-1, the controller 21 determines that it is abnormal.

Next, as illustrated in FIG. 4, contents of a write data bus of the first processor 11*a* are transmitted to the comparator 14-2 through the multiplexer 12-2 and through the delay circuit 13-2.

On the other hand, the checker processor 16 outputs contents of a write data bus to the comparator 14-2. The comparator 14-2 compares the contents of the write data bus of the first processor 11*a* with the contents of the write data bus of the checker processor 16, and when the contents of the write data buses do not match each other, the comparator 14-2 outputs an abnormal signal to the controller 21. Based on the abnormal signal from the comparator 14-2, the controller 21 determines that it is abnormal.

Figure 5:
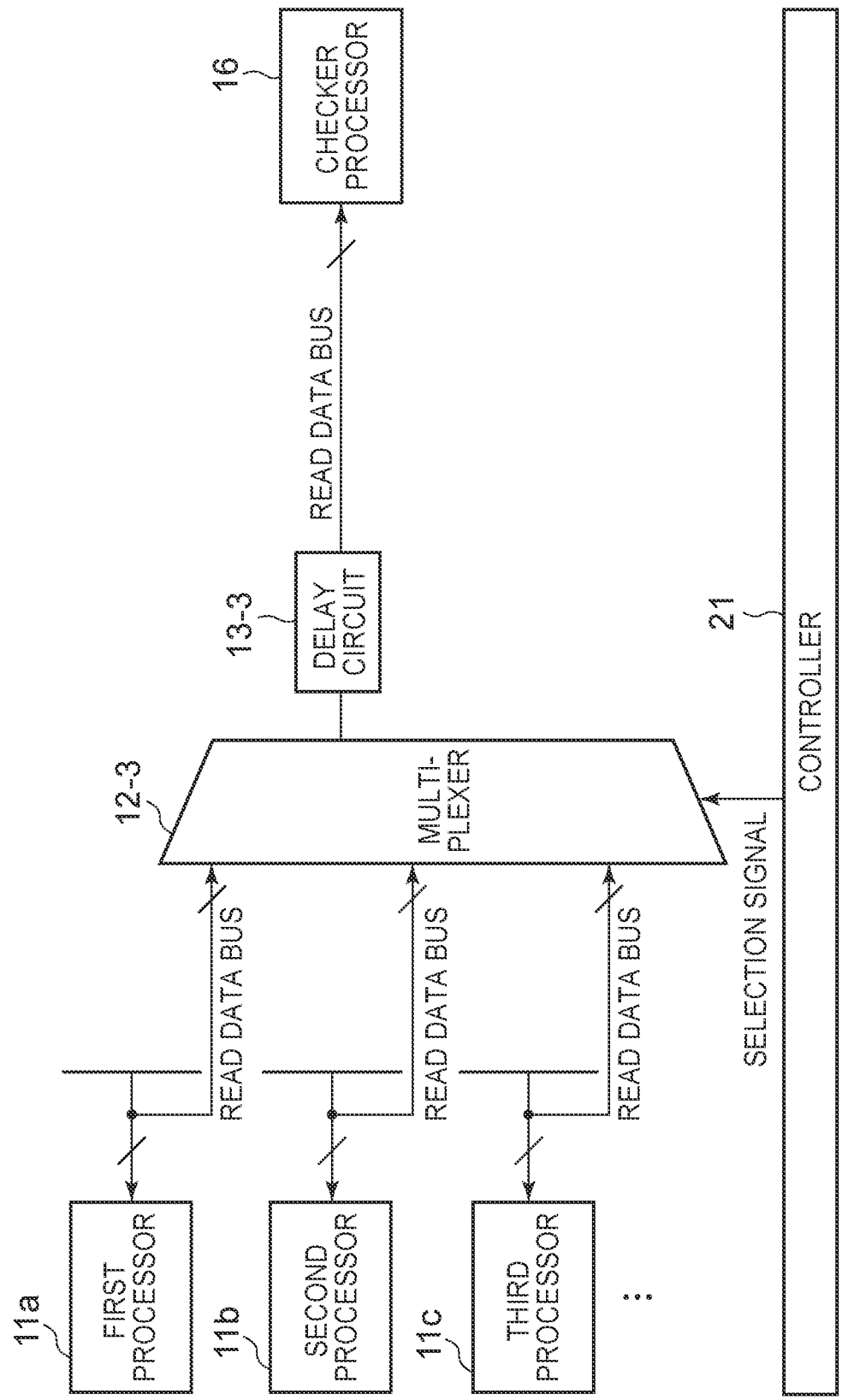
FIG. 5 is a diagram illustrating wire connections of read data buses of processors and checker processor of multicore system, such as in the example 1.

FIG. 5 illustrates wire connections of read data buses of the processors, the multiplexer 12-3 that selects the read data buses of the processors, the delay circuit 13-3, and a read data bus of the checker processor 16.

FIG. 6 illustrates detection of abnormality in an output with respect to an event input. First, the event input is inputted to each of the processors 11*a* to 11*c*. The event input is then delayed by the delay circuit 17 and is transmitted to the checker processor 16.

Next, an event output of the first processor 11*a* is selected by the multiplexer 12-4 and is transmitted to the comparator 14-4 through the delay circuit 13-4. The checker processor 16 outputs an event output to the comparator 14-4.

The comparator 14-4 compares the event output of the first processor 11*a* with the event output of the checker processor 16, and when the event outputs do not match each other, the comparator 14-4 outputs an abnormal signal to the controller 21. Based on the abnormal signal from the comparator 14-4, the controller 21 determines that it is abnormal.

As described above, according to the multicore system of the example 1, the single checker processor 16 is used, and once the multiplexer 12-X selects either one of the multiple processors 11*a* to 11*c*, the comparator 14-X compares the external state of the processor selected by the multiplexer 12-X with the external state of the checker processor 16, or the comparator 14-X compares the internal state of the processor selected by the multiplexer 12-X with the internal state of the checker processor 16. The controller 21 determines that the selected processor or the checker processor is abnormal when the external states or the internal states do not match each other based on the comparison results obtained by the comparator 14-X.

That is, since only one checker processor 16 is used, it is possible to inhibit the increase in the amount of the hardware and the power consumption and to allow the processor to operate continuously without stopping the practical operation.

Additionally, depending on the capabilities of the processors 11*a* to 11*c*, if the processors are required to have higher reliability for example, the comparator 14-X increases the frequency of the comparing of the processor selected by the multiplexer 12-X with the checker processor 16. This makes it possible to check the processors required to have higher reliability more frequently.

Moreover, with the delay circuits 13-X, 17, and 18 displacing the timings of the operations of the processors 11*a* to 11*c* from the timings of the practical operations, it is possible to prevent a wrong determination due to the power supply noise.

According to one or more embodiments, a single checker processor is used, and once a selector selects either one of multiple processors, an internal state, internal data, and a pipeline state are copied from the one of the multiple processors to the checker processor, and a comparator compares an external state of the processor selected by the selector with an external state of the checker processor, or the comparator compares an internal state of the processor selected by the selector with an internal state of the checker processor. A controller determines that the selected processor or the checker processor is abnormal when the external states or the internal states do not match each other based on the comparison result obtained by the comparator.

That is, since only one checker processor is used, it is possible to inhibit the increase in the amount of the hardware and the power consumption and to allow the processor to operate continuously without stopping the practical operation.

One or more embodiments may apply to a microcomputer and the like for vehicle installation that may be required to have high reliability, for example.

The invention claimed is:
1. A multicore system, comprising:
  processors that execute processing different from each other;
    a selector that selects one of the processors;
    a checker processor;
    a comparator that compares an external state of the processor selected by the selector with an external state of the checker processor, or compares an internal state of the processor selected by the selector with an internal state of the checker processor; and
    a controller that determines that the selected processor or the checker processor is abnormal in response to the external states or the internal states not matching each other based on comparison results obtained by the comparator.

2. The multicore system according to claim 1, further comprising:
  a copy controller that copies the internal state of the processor selected by the selector to the checker processor in response to starting the comparing of the external states or the internal states between the processor selected by the selector and the checker processor.

3. The multicore system according to claim 2, wherein the selector selects processors from the processors by a round robin method.

4. The multicore system according to claim 2, wherein the selector selects processors from the processors by time sharing based on a selection signal from the controller.

5. The multicore system according to claim 1, wherein the selector selects processors from the processors by a round robin method.

6. The multicore system according to claim 1, wherein the comparator changes a frequency of the comparing of the processor selected by the selector with the checker processor based on a required level of reliability.

7. The multicore system according to claim 1, wherein the comparator increases a frequency of the comparing of the processor selected by the selector with the checker processor in response to a required level of reliability being higher.

8. The multicore system according to claim 6, further comprising:
- a first delay circuit that delays the external state or the internal state from the processor selected by the selector for a predetermined delay time and outputs the external state or the internal state of the processor selected by the selector to the comparator;
- a second delay circuit that delays the internal state of the processor selected by the selector for a predetermined delay time and outputs the internal state of the processor selected by the selector to the checker processor in response to starting the comparing of the processor selected by the selector with the checker processor; and
- a third delay circuit that delays an event input for a predetermined delay time and outputs the event input to the checker processor.

9. The multicore system according to claim 6, wherein
- the processors and the checker processor are formed of the same hardware.

10. The multicore system according to claim 1, wherein
- the selector selects processors from the processors by time sharing based on a selection signal from the controller.

\* \* \* \* \*